(12) United States Patent
Ben David et al.

(10) Patent No.: US 12,489,740 B2
(45) Date of Patent: *Dec. 2, 2025

(54) TECHNIQUES FOR MITIGATING LEAKAGE OF USER CREDENTIALS

(71) Applicant: IntSights Cyber Intelligence Ltd., Tel Aviv (IL)

(72) Inventors: Gal Ben David, Petah Tikva (IL); Amir Hozez, Ganei Tiqwa (IL); Alon Arvatz, Raanana (IL); Guy Nizan, New York, NY (US)

(73) Assignee: IntSights Cyber Intelligence Ltd., Tel Aviv-Jaffa (IL)

( * ) Notice: Subject to any disclaimer, the term of this patent is extended or adjusted under 35 U.S.C. 154(b) by 0 days.

This patent is subject to a terminal disclaimer.

(21) Appl. No.: 18/463,738

(22) Filed: Sep. 8, 2023

(65) Prior Publication Data

US 2023/0421547 A1 Dec. 28, 2023

Related U.S. Application Data

(63) Continuation of application No. 17/836,947, filed on Jun. 9, 2022, now Pat. No. 11,792,178, which is a continuation of application No. 16/351,535, filed on Mar. 13, 2019, now Pat. No. 11,405,374.

(51) Int. Cl.
*H04L 9/40* (2022.01)
*G06N 3/04* (2023.01)
*G06N 3/08* (2023.01)

(52) U.S. Cl.
CPC .............. *H04L 63/08* (2013.01); *G06N 3/04* (2013.01); *G06N 3/08* (2013.01); *H04L 63/20* (2013.01)

(58) Field of Classification Search
CPC ....... H04L 63/08; H04L 63/20; H04L 9/0894; H04L 9/3226; G06N 3/04; G06N 3/08
See application file for complete search history.

(56) References Cited

U.S. PATENT DOCUMENTS

| | | | |
|---|---|---|---|
| 7,571,467 B1 * | 8/2009 | Priestley | H04L 9/3226 709/200 |
| 11,405,374 B2 | 8/2022 | David et al. | |
| 11,792,178 B2 | 10/2023 | Ben David et al. | |
| 2007/0266433 A1 * | 11/2007 | Moore | G06F 21/53 726/15 |
| 2014/0115670 A1 * | 4/2014 | Barton | G06F 21/36 726/4 |
| 2015/0254642 A1 * | 9/2015 | Bondesen | G06Q 20/4016 705/41 |
| 2016/0026999 A1 * | 1/2016 | Kurian | G06Q 20/322 705/44 |

(Continued)

*Primary Examiner* — Khoi V Le
(74) *Attorney, Agent, or Firm* — Wolf, Greenfield & Sacks, P.C.

(57) ABSTRACT

Systems and methods of mitigating leakage of credentials of a user of a computer network, including monitoring at least one data source to scrape data that is compatible with credential data, applying a machine learning algorithm to the scraped data to identify at least one potential leaked credential, wherein the at least one potential leaked credential is identified using at least one neural network, authenticating the identified at least one potential leaked credential by a database of valid credentials of the computer network, and replacing credentials corresponding to the at least one leaked credential.

20 Claims, 4 Drawing Sheets

(56) References Cited

U.S. PATENT DOCUMENTS

| | | | |
|---|---|---|---|
| 2016/0134619 A1* | 5/2016 | Mikheev | H04L 63/0884 |
| | | | 726/8 |
| 2016/0352769 A1* | 12/2016 | Bryant | H04L 63/1433 |
| 2018/0034858 A1* | 2/2018 | Gummaraju | H04L 63/08 |
| 2018/0046796 A1* | 2/2018 | Wright | G06F 21/45 |
| 2018/0240107 A1* | 8/2018 | Andrade | G06Q 20/065 |
| 2019/0089740 A1* | 3/2019 | Hastings | H04L 41/0895 |
| 2020/0285737 A1* | 9/2020 | Kraus | G06F 21/552 |
| 2020/0296081 A1 | 9/2020 | Ben David et al. | |
| 2022/0321550 A1 | 10/2022 | Ben David et al. | |

* cited by examiner

US 12,489,740 B2

TECHNIQUES FOR MITIGATING LEAKAGE OF USER CREDENTIALS

This application claims priority under 35 U.S.C. § 120 and is a continuation of U.S. patent application Ser. No. 17/836,947, filed Jun. 9, 2022, titled "TECHNIQUES FOR MITIGATING LEAKAGE OF USER CREDENTIALS," which claims priority under 35 U.S.C. § 120 and is a continuation of U.S. patent application Ser. No. 16/351,535, filed Mar. 13, 2019, titled "SYSTEM AND METHOD FOR AUTOMATIC MITIGATION OF LEAKED CREDENTIALS IN COMPUTER NETWORKS," which are hereby incorporated by reference herein in their entirety.

FIELD OF THE INVENTION

The present invention relates to computer networks. More particularly, the present invention relates to systems and methods for automatic mitigation of leaked credentials in computer networks.

BACKGROUND OF THE INVENTION

Computer networks are constantly vulnerable to malicious attacks by hackers. Some hackers may use social engineering tools or other methods in order to gather data (e.g., email addresses, passwords, etc.) about the target computer networks. While various cyber security applications are available, for instance antivirus software and firewalls, these solutions typically cannot prevent attacks where the attacker is in possession of private information of the computer network. For instance, a user in an organization with a private computer network can post a blog in an external website using the same credentials as used in an account of the computer network, such that attackers may steal these credentials and attempt to attack the organization with the stolen data.

It can be difficult to monitor all internet traffic for leaked credentials (e.g., leaked passwords) and/or act to mitigate the threat they pose. To monitor the leaked credentials, it can be possible to parse and/or store leaked databases to prevent hacking operations. Many organizations in the world have been hacked, and their database leaked by the hackers. Those databases can consist of valuable data such as credentials. Downloading such databases, parsing them, and/or storing the precious data is one typically used approach for identifying leaked credentials. Another typical approach is to monitor malicious sources to look for credentials, where these sources can be known for publishing leaked data along legitimate data.

Currently, one approach for mitigating the threat is to take the leaked passwords, identify the persons behind them within the organization, and ask them to change their password (and/or enforce a password change). This can result in a process consuming time of the technical stuff, as it is typically not automated.

SUMMARY OF THE INVENTION

There is thus provided, in accordance with some embodiments of the invention, a method of mitigating leakage of credentials of a user of a computer network, the method including monitoring, by a processor in communication with the computer network, at least one data source to scrape data that is compatible with credential data, applying a machine learning algorithm to the scraped data, by the processor, to identify at least one potential leaked credential, wherein the at least one potential leaked credential is identified using at least one neural network, authenticating, by an active directory application of the computer network, the identified at least one potential leaked credential by a database of valid credentials of the computer network, and replacing credentials corresponding to the at least one leaked credential, by the active directory application.

In some embodiments, the machine learning algorithm is trained on a predetermined set of credentials to identify credentials in an unstructured text. In some embodiments, the machine learning algorithm is configured to identify credentials in chunks of the unstructured text.

In some embodiments, the at least one potential leaked credential is checked to correspond to at least one predetermined domain name of the computer network. In some embodiments, the at least one data source is external to the computer network. In some embodiments, the scraping of data is carried out periodically at predetermined times.

In some embodiments, an alert is issued to the user corresponding to the authenticated at least one leaked credential. In some embodiments, the authenticated at least one leaked credential is removed from the at least one data source. In some embodiments, irrelevant credentials are filtered out from the identified at least one potential leaked credential in accordance with the active directory application.

There is thus provided, in accordance with some embodiments of the invention, a system for mitigation of leakage of credentials of a user of a computer network, the system including a database of valid credentials of the computer network, an active directory application of the computer network, and a processor, in communication with at least one data source, wherein the processor is configured to: monitor the at least one data source, and apply a machine learning algorithm to the monitored data to identify at least one potential leaked credential. In some embodiments, the at least one potential leaked credential is identified using at least one neural network. In some embodiments, the active directory application is configured to: authenticate the identified at least one potential leaked credential by the database of valid credentials, and replace credentials corresponding to the at least one leaked credential.

In some embodiments, the machine learning algorithm is trained on a predetermined set of credentials to identify credentials in an unstructured text. In some embodiments, the machine learning algorithm is configured to identify credentials in chunks of the unstructured text. In some embodiments, the processor is configured to check if the at least one potential leaked credential corresponds to at least one predetermined domain name of the computer network. In some embodiments, the at least one data source is external to the computer network. In some embodiments, the processor is configured to scrape data periodically at predetermined times. In some embodiments, the processor is configured to issue an alert to the user corresponding to the authenticated at least one leaked credential. In some embodiments, the processor is configured to remove the authenticated at least one leaked credential from the at least one data source. In some embodiments, the processor is configured to filter out irrelevant credentials from the identified at least one potential leaked credential in accordance with the active directory application.

There is thus provided, in accordance with some embodiments of the invention, a method of mitigating leakage of credentials of a user of a computer network, the method including monitoring, by a processor in communication with the computer network, at least one data source to scrape data compatible with credential data, applying a machine learning algorithm to the scraped data, by the processor, to identify at least one potential leaked credential, wherein the at least one potential leaked credential is identified using at least one neural network, authenticating, by of the computer network, the identified at least one potential leaked credential by a database of valid credentials of the computer network, and removing the authenticated at least one leaked credential from the at least one data source. In some embodiments, credentials corresponding to the at least one leaked credential are replaced by an active directory application of the computer network.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
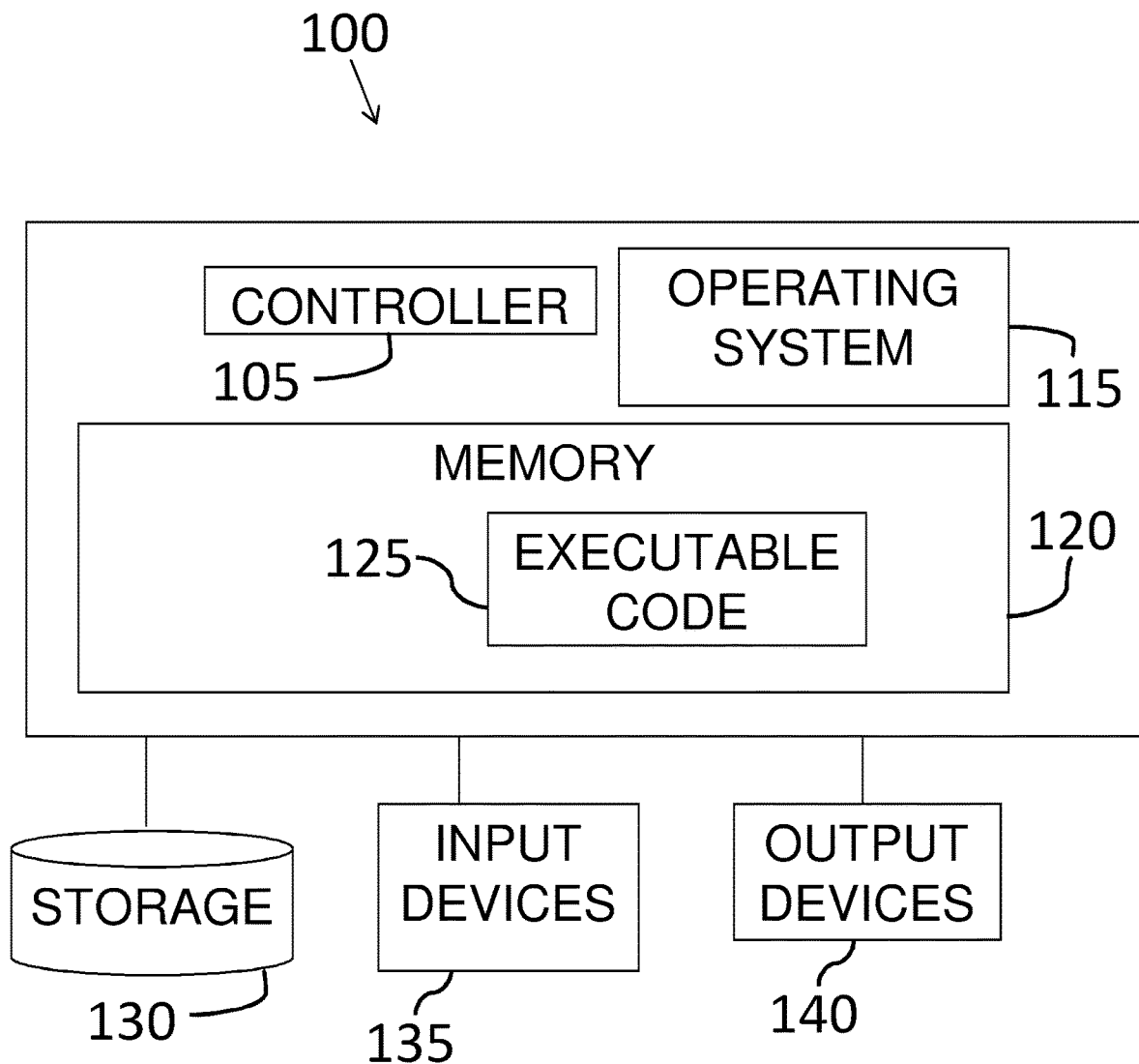
FIG. 1 shows a block diagram of a computing device, according to some embodiments of the invention.

It will be appreciated that, for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently.

According to some embodiments, systems and methods are provided for automatic mitigation of leaked credentials in computer networks. External data sources (e.g., websites where hackers publish stolen data) may be monitored to retrieve potential leaked credentials and authenticate and/or validate integrity of the retrieved data by comparison to internal credential data of the computer network to verify that the credentials were indeed leaked. Finally, the leaked credentials may be mitigated by automatically replacing the corresponding credentials in the computer network and/or removing the publication in the relevant external data source. If such a process was to be carried out by a human analyst, the result would be a process that constantly changes based on the particular human, and some humans may make errors (e.g., fail to enforce the credential change, miss a leaked credential within unstructured text, etc.). Therefore, automation of mitigating leaked credentials is an advantage that may eliminate the human error.

Reference is made to FIG. 1, showing a block diagram of an exemplary computing device, according to some embodiments of the present invention. Computing device 100 may include a controller 105 that may be, for example, a central processing unit processor (CPU), a chip or any suitable computing or computational device, an operating system 115, a memory 120, a storage 130, input devices 135 and output devices 140. Controller 105 may be configured to carry out methods as disclosed herein by for example executing code or software.

Operating system 115 may be or may include any code segment designed and/or configured to perform tasks involving coordination, scheduling, arbitration, supervising, controlling or otherwise managing operation of computing device 100, for example, scheduling execution of programs. Operating system 115 may be a commercial operating system. Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include a plurality of, possibly different memory units.

Executable code 125 may be any executable code, e.g., an application, a program, a process, task or script. Executable code 125 may be executed by controller 105 possibly under control of operating system 115. For example, executable code 125 may be an application for monitoring interactions in computer systems. Where applicable, executable code 125 may carry out operations described herein in real-time. Computing device 100 and executable code 125 may be configured to update, process and/or act upon information at the same rate the information, or a relevant event, are received. In some embodiments, more than one computing device 100 may be used. For example, a plurality of computing devices that include components similar to those included in computing device 100 may be connected to a network and used as a system.

Storage 130 may be or may include, for example, a hard disk drive, a Compact Disk (CD) drive, a CD-Recordable (CD-R) drive, a universal serial bus (USB) device or other suitable removable and/or fixed storage unit. Data may be stored in storage 130 and may be loaded from storage 130 into memory 120 where it may be processed by controller 105. In some embodiments, some of the components shown in FIG. 1 may be omitted. For example, memory 120 may be a non-volatile memory having the storage capacity of storage 130. Accordingly, although shown as a separate component, storage 130 may be embedded or included in memory 120.

Input devices 135 may be or may include a mouse, a keyboard, a touch screen or pad or any suitable input device. It will be recognized that any suitable number of input devices may be operatively connected to computing device 100 as shown by block 135. Output devices 140 may include one or more displays, speakers and/or any other suitable output devices. It will be recognized that any suitable number of output devices may be operatively connected to computing device 100 as shown by block 140. Any applicable input/output (I/O) devices may be connected to computing device 100 as shown by blocks 135 and 140. For example, a wired or wireless network interface card (NIC), a modem, printer or facsimile machine, a universal serial bus (USB) device or external hard drive may be included in input devices 135 and/or output devices 140.

Some embodiments of the invention may include an article such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, cause the processor to carry out methods disclosed herein. For example, some embodiments of the invention may include a storage medium such as memory 120, computer-executable instructions such as executable code 125 and a controller such as controller 105.

A computer or processor non-transitory storage medium, may include for example a memory, a disk drive, or a USB flash memory, encoding, including or storing instructions, e.g., computer-executable instructions, which when executed by a processor or controller, carry out methods disclosed herein. The storage medium may include, but is not limited to, any type of disk including floppy disks, optical disks, compact disk read-only memories (CD-ROMs), rewritable compact disk (CD-RWs), and magneto-optical disks, semiconductor devices such as read-only memories (ROMs), random access memories (RAMs), such as a dynamic RAM (DRAM), erasable programmable read-only memories (EPROMs), flash memories, electrically erasable programmable read-only memories (EEPROMs), magnetic or optical cards, or any type of media suitable for storing electronic instructions, including programmable storage devices.

In some embodiments, a system may include or may be, for example, a personal computer, a desktop computer, a mobile computer, a laptop computer, a notebook computer, a terminal, a workstation, a server computer, a Personal Digital Assistant (PDA) device, a tablet computer, a network device, or any other suitable computing device. Unless explicitly stated, the method embodiments described herein are not constrained to a particular order or sequence. Additionally, some of the described method embodiments or elements thereof can occur or be performed at the same point in time.

Figure 2:
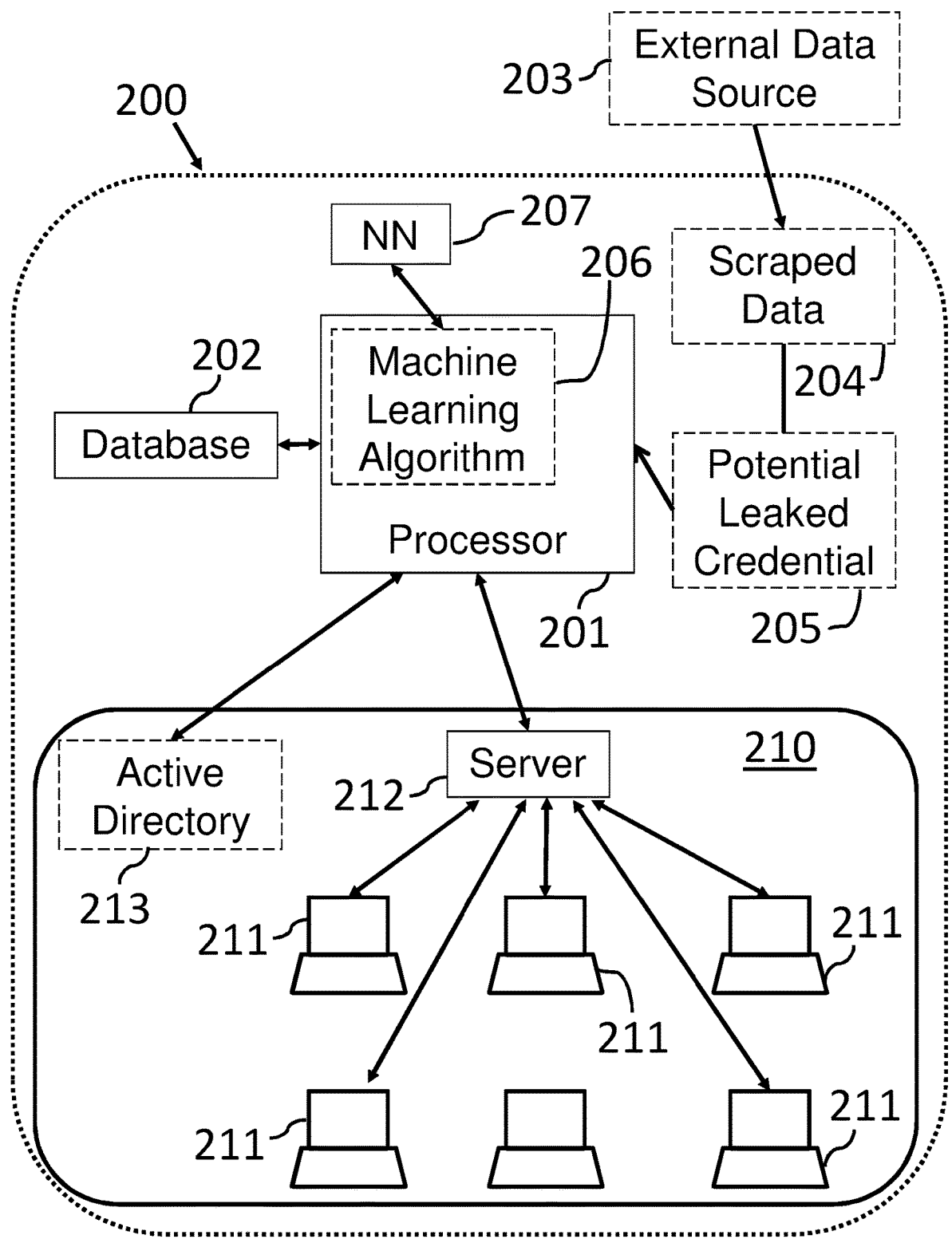
FIG. 2 shows a block diagram of a system for mitigation of leakage of credentials of a user of a computer network, according to some embodiments of the invention.

Reference is now made to FIG. 2, which shows a block diagram of a system 200 for mitigating leakage of credentials of a user of a computer network 210, according to some embodiments. A user of computer network 210 may be any person using a computing device of computer network 210. Computer network 210, for instance a computer network of an organization, may include at least one computing device 211 (e.g., similar to the computing device 100 shown in FIG. 1) in communication with at least one server 212. The system 200 may include a processor 201 (e.g., similar to computing device 100 shown in FIG. 1) in communication with the computer network 210, for instance communicating via at least one server 212. In some embodiments, the direction of arrows in FIG. 2 indicates the direction of information flow. In some embodiments, hardware elements of system 200 are indicated with a solid line in FIG. 2.

The system 200 may include a database 202 (e.g., similar to storage 130 as shown in FIG. 1) coupled to the processor 201 (e.g., connected via a wired/wireless connection), with the database 202 storing valid credentials (e.g., email addresses, usernames and/or passwords) of the computer network 210. In some embodiments, the system 200 includes an active directory application 213 of the computer network 210, the active directory application 213 coupled to the processor 201 and configured to manage credentials within the computer network 210. In some embodiments, the system 200 includes a virtual appliance embedded within the computer network 210 to create an interface between the active directory application 213 and the processor 201.

According to some embodiments, the processor 201 is in communication with at least one external data source 203, such as an external website (not shown) where hackers post stolen credentials. The at least one external data source 203 may include leaked data published by hackers that maliciously extracted data (not only credentials) from different hacked organizations, for instance an organization external to the computer network 210. Data retrieved or extracted from the at least one external data source 203 may include at least one potential leaked credential 205 related to the computer network 210, for instance stored at a dedicated potential leaked credentials database. For example, in case that a large database is leaked (e.g., a database of Amazon's customers) and employees of the organization operating the computer network 210 have users with credentials stored in the leaked database, then the credentials of the computer network 210 may also be at risk.

The at least one external data source 203, in some embodiments, includes sources that are dedicated to publishing malicious content. Such sources (e.g., websites) may be particularly used by hackers to publish leaked data that they extracted, when the data source maintains anonymity for the publishers. The processor 201 may initiate scraping of the at least one external data source 203 to extract any leaked data as soon as it is published, and for instance storing scraped data 204 at a dedicated scraped data database for future analysis (e.g., to extract credentials). In some embodiments, scraping of data is carried out periodically at predetermined times (such as for example, every week, once a month, once a day, and/or every hour).

It should be noted that (raw) data not yet processed in at least one external data source 203 may include various types of data and not only credentials, for example a textual document with various information including credentials therein. The processor 201 may identify and extract only credentials from the data in the at least one external data source 203, for instance extract passwords from a long textual passage, e.g., by applying a machine learning algorithm as further detailed below.

According to some embodiments, the processor 201 applies a machine learning algorithm 206 on (monitored) data of the at least one data source 203 in order to identify at least one potential leaked credential 205 using at least one neural network (NN) 207, for instance monitoring the at least one data source 203 to retrieve potential credentials. A neural network (e.g., NN implementing machine learning) may refer to an information processing paradigm that may include nodes, referred to as neurons, organized into layers, with links between the neurons. The links may transfer signals between neurons and may be associated with weights. A NN may be configured or trained for a specific task, e.g., pattern recognition or classification. Training a NN for the specific task may involve adjusting these weights based on examples. Each neuron of an intermediate or last layer may receive an input signal, e.g., a weighted sum of output signals from other neurons, and may process the input signal using a linear or nonlinear function (e.g., an activation function). The results of the input and intermediate layers may be transferred to other neurons and the results of the output layer may be provided as the output of the NN. Typically, the neurons and links within a NN are represented by mathematical constructs, such as activation functions and matrices of data elements and weights. A processor, e.g. CPUs or graphics processing units (GPUs), or a dedicated hardware device may perform the relevant calculations.

The machine learning algorithm 206 may be initially trained to identify credentials from input data (e.g., a text including credentials as well as non-credentials). For example, if the machine learning algorithm 206 receives the text "tiger" or "pass123456" as input, the output may be to determine what is the probability of that text to be a credential, such as a password.

Figure 3:
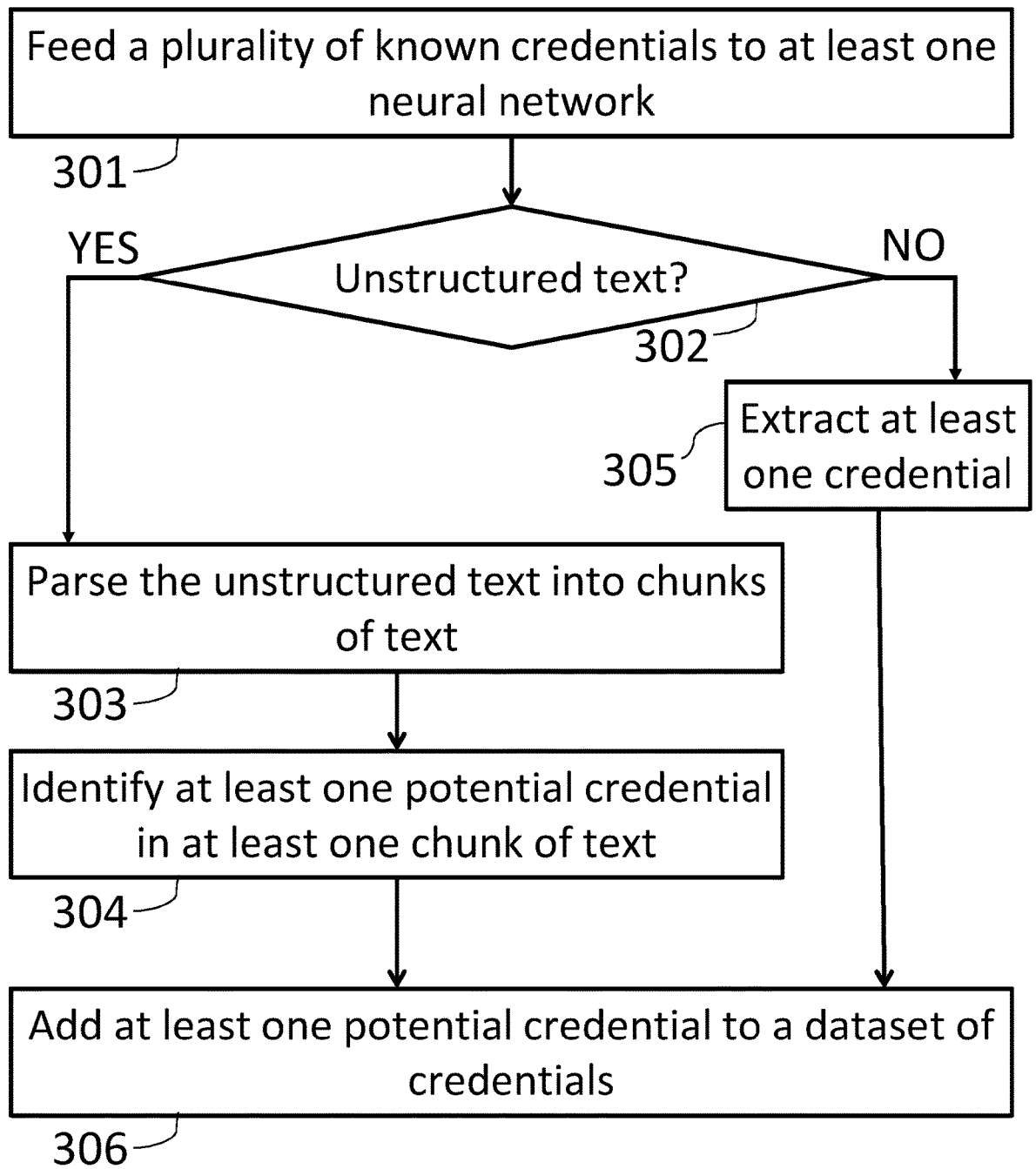
FIG. 3 shows a flowchart for a method of training a machine learning algorithm to identify credentials, according to some embodiments of the invention.

Reference is now made to FIG. 3, which shows a flowchart for a method of training a machine learning algorithm to identify credentials, according to some embodiments. The machine learning algorithm 206 may be trained by feeding 301 a plurality of known credentials (e.g., known credentials that may have been previously leaked and/or credentials as input by a user) such as validated passwords and/or email addresses, etc., to the at least one neural network 207 until the pattern and/or structure of credentials is learned. Thus, a machine learning model may be created, for instance trained with a neural network as is known in the art, where similarity to credentials may be determined for an unknown and/or unstructured input (e.g., text).

In case that the input includes unstructured text 302, the unstructured text 302 may be parsed 303 into groups of text (e.g., chunks of text) such as terms within a sentence, that potentially include at least one credential therein. Unstructured text, for example user-generated information such as emails or social media postings, may be any written content (without metadata), for example content written by a human user in a word processor program and/or any content readable by a human user, not organized in a pre-defined manner and/or may not be indexed onto standard database fields.

In some embodiments, determining that a chunk of text includes at least one credential, involves determining that at least one potential credential identified 304 within the chunk of text corresponds to a context of credentials. The context of text, within the chunk of text, can be the line of text previous to the potential credential and also the line of text following the potential credential such that analysis of the entire passage may determine the appropriate context of the text (e.g., being a potential credential or not), for instance using known algorithms. In some embodiments, identified potential credential samples are tagged (e.g., by another computing program and/or human analyst) in order to improve the identification by the machine learning algorithm 206.

For example, "Password1!" may resemble a password, but it may be in two different contexts. The first context can result in the term "Password!" being an actual password, a second context can result in the term "Password!" as being a phrase or other form of text. If the potential credential is for instance within the sentence: "It is known that Password1! is one of the most common passwords in the world", it may not be identified as a leaked credential, while for the sentence: "User: admin, Password: Password1!" may be identified as a leaked credential.

In some embodiments, the input includes regular text (e.g., without unstructured text 302), and the machine learning algorithm 206 may directly extract 305 at least one potential credential. Once at least one potential credential is extracted and/or identified, it may be added 306 to a dataset of credentials for future use by the machine learning algorithm 206.

Reference is now made back to FIG. 2, according to some embodiments the system 200 identifies assets of the computer network 210 (e.g., assets of the organization operating the computer network 210) among at least one potential leaked credential 205. The processor 201 may check if at least one potential leaked credential 205 corresponds to at least one predetermined domain name of computer network 210. For example, if the system 200 is to protect the organization "Roogle" operating the computer network 210 including their domain "roogle.com", then the processor 201 may identify users of that domain in order to identify related leaked credentials, for example identifying leaked passwords for a user with an email address "bob@roogle.com".

In some embodiments, details of users of the computer network 210 are stored at the database 202 in order compare the potential leaked credentials 205 with data of those users.

According to some embodiments, the system 200 identifies at least one potential leaked credential 205, classify the identified at least one potential leaked credential 205 into relevant (e.g., corresponding to the computer network 210) and irrelevant credentials, and/or mitigate threats from leaked credentials. In some embodiments, the active directory application 213 replaces credentials corresponding to the at least one leaked credential (e.g., automatically change passwords with predefined replacement password instead of the leaked passwords) to mitigate the threat caused by the leaked credentials. The processor 201 may filter out irrelevant credentials from the identified at least one potential leaked credential 205 in accordance with the active directory application 213.

Upon determination of at least one potential leaked credential 205, the active directory application 213 may authenticate at least one potential leaked credential 205 by the database 202 of valid credentials, for instance by checking that the passwords of the computer network 210 are compatible to the potential leaked credential and/or checking that the passwords are still valid. In case that the active directory application 213 does not authenticate at least one potential leaked credential 205, there may be no need to issue an alert. In case that active directory application 213 authenticates the at least one potential leaked credential 205, an alert may be issued to a predefined party, for instance to the security administrator and/or the user of the computer network 210. In some embodiments, if the active directory application 213 authenticates the at least one potential leaked credential 205, the at least one leaked credential is automatically reset (e.g., automatically reset a password at the active directory application 213).

If the active directory application 213 authenticates at least one potential leaked credential 205, the system 200 may externally mitigate the threat, e.g., being carried out externally to the system 200, by removing and/or blocking the leaked data at the at least one external data source 203 (e.g., send a request to a social media website to remove a malicious publication). In some embodiments, the system 200 externally mitigates the threat by blocking communication to and/or from leaked credentials (e.g., blocking access to a hacked email address) with corresponding instructions to the perimeter of the computer network, for instance the firewall and/or mail gateway and/or web proxy and/or a virtual private network (VPN) server. In some embodiments, for computer networks of large organizations, the mail gateway is connected to the active directory application, such that the same credential (e.g., password or email) works as well as on each user's PC or laptop.

Figure 4:
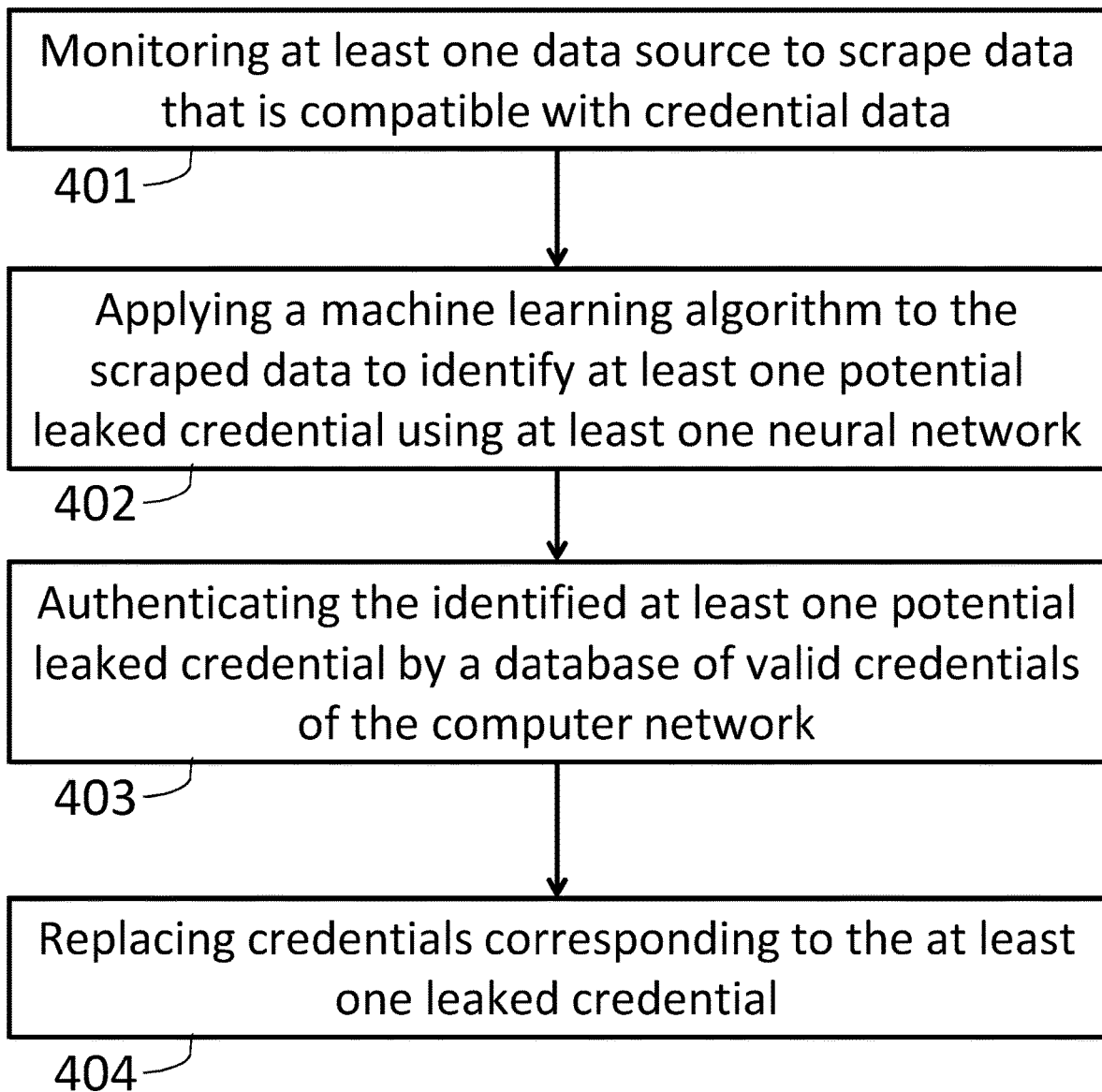
FIG. 4 shows a flowchart for a method of mitigating leakage of credentials of a user of a computer network, according to some embodiments of the invention.

Reference is now made to FIG. 4, which shows a flowchart of a method of mitigating leakage of credentials of a user of a computer network (210 in FIG. 2), according to some embodiments. In step 401, a processor (such as processor 201 in FIG. 2), in communication with computer network 210, may monitor at least one data source (203 in FIG. 2) to scrape data that is compatible with credential data (e.g., passwords and/or usernames and/or email addresses). According to some embodiments, in step 402, processor 201 applies a machine learning algorithm (206 in FIG. 2) to scraped data 204 to identify at least one potential leaked credential 205, wherein the at least one potential leaked credential is identified using at least one neural network (207 in FIG. 2).

In some embodiments, in step 403, active directory application (213 in FIG. 2), of the computer network 210, authenticates the identified at least one potential leaked credential 205 by a database 202 of valid credentials of the computer network 210. To mitigate the threat, in step 404, the processor 201 may instruct the active directory application 213 to replace credentials corresponding to the at least one leaked credential 205 and/or remove the leaked data from the at least one external data source 203.

In some embodiments, the system 200 improves computer security by mitigating leakage of credentials thereby improving computer network technology. The system 200 also improves the technological problem of extracting leaked credentials from unstructured sources, such as free texts. The system 200 may apply a dedicated machine learning algorithm to identify potential leaked credentials within any text to be extracted for mitigation. The system 200 may also provide immediate response to block the leaked data (e.g., after validation of the extracted potential leaked credentials) due to the automation of the process, since there is no need to wait for an action by a human administrator. In some embodiments, integration of the system 200 into any computer network allows automatic mitigation of leaked credentials thereby preventing malicious attacks on the network that can take advantage of leaked credentials.

Unless explicitly stated, the method embodiments described herein are not constrained to a particular order in time or chronological sequence. Additionally, some of the described method elements can be skipped, or they can be repeated, during a sequence of operations of a method.

Various embodiments have been presented. Each of these embodiments may of course include features from other embodiments presented, and embodiments not specifically described may include various features described herein.

The invention claimed is:

1. A method for mitigating leakage of user credentials of users of a computer network, the method comprising:
monitoring, by a processor in communication with the computer network, at least one data source that is external to the computer network, to scrape data;
analyzing, using at least one machine learning model trained to identify a pattern or structure of credentials, the scraped data to identify at least one potential leaked user credential from the scraped data;
determining, by an active directory application of the computer network and using a database of valid user credentials of the computer network, whether the identified at least one potential leaked user credential corresponds to at least one valid user credential of the user of the computer network; and
after the active directory application determines that the identified at least one potential leaked user credential corresponds to the at least one valid user credential of the computer network, replacing, by the active directory application, the at least one valid user credential corresponding to the identified at least one potential leaked user credential.

2. The method of claim 1, wherein identifying the at least one potential leaked user credential from the scraped data comprises identifying the at least one potential leaked user credential from the scraped data using at least one neural network trained on a predetermined set of credentials to identify credentials in unstructured text, wherein the credentials comprise e-mail addresses, usernames, and passwords.

3. The method of claim 2, further comprising training the at least one neural network on the predetermined set of credentials to identify the credentials in the unstructured text.

4. The method of claim 1, further comprising checking if the at least one potential leaked user credential corresponds to at least one predetermined domain name of the computer network.

5. The method of claim 1, wherein the at least one data source that is external to the computer network is a website for publishing leaked data that was extracted from computer networks.

6. The method of claim 1, wherein the monitoring comprises periodically scraping at predetermined times.

7. The method of claim 1, further comprising issuing an alert to a user corresponding to the identified at least one potential leaked user credential.

8. The method of claim 1, further comprising removing the identified at least one potential leaked user credential from the at least one data source.

9. The method of claim 1, wherein the at least one valid user credential comprises at least one valid e-mail address, at least one username, and/or password.

10. A system for mitigation of leakage of user credentials of users of a computer network, the system comprising:
a processor; and
a non-transitory storage medium storing computer-executable instructions that, when executed by the processor, cause the processor to:
monitor at least one data source external to the computer network to scrape data; and
analyze, using at least one machine learning model trained to identify a pattern or structure of credentials, the scraped data to identify at least one potential leaked user credential from the scraped data;

determine, by an active directory application of the computer network and using a database of valid user credentials, whether the identified at least one potential leaked user credential corresponds to at least one valid user credential of the user of the computer network; and after the active directory application determines that the identified at least one potential leaked user credential corresponds to the at least one valid user credential of the computer network, replace, by the active directory application, the at least one valid user credential corresponding to the identified at least one potential leaked user credential.

11. The system of claim 10, wherein identifying the at least one potential leaked user credential from the scraped data comprises identifying the at least one potential leaked user credential from the scraped data using at least one neural network trained on a predetermined set of credentials to identify credentials in unstructured text, wherein the credentials comprise e-mail addresses, usernames, and passwords.

12. The system of claim 11, wherein the at least one neural network is trained to identify credentials in chunks of the unstructured text.

13. The system of claim 10, wherein the instructions further cause the processor to check if the at least one potential leaked user credential corresponds to at least one predetermined domain name of the computer network.

14. The system of claim 10, wherein the at least one data source external to the computer network is a website for publishing leaked data that was extracted from computer networks.

15. The system of claim 10, wherein the instructions further cause the processor to periodically scrape data from the at least one data source.

16. The system of claim 10, wherein the instructions further cause the processor to issue an alert to the user corresponding to the identified at least one potential leaked user credential.

17. The system of claim 10, wherein the instructions further cause the processor to remove the identified at least one potential leaked credential from the at least one data source.

18. The system of claim 10, wherein the instructions further cause the processor to filter out irrelevant credentials from the identified at least one potential leaked user credential in accordance with the active directory application.

19. A non-transitory storage medium storing computer-executable instructions, that when executed by a processor, cause the processor to perform a method for mitigating leakage of user credentials of users of a computer network, the method comprising:

monitoring at least one data source that is external to the computer network, to scrape data;

analyzing, using at least one machine learning model trained to identify a pattern or structure of credentials, the scraped data to identify at least one potential leaked user credential of the scraped data;

determining, using a database of valid user credentials of the computer network, whether the identified at least one potential leaked user credential corresponds to at least one valid user credential of the user of the computer network; and after determining that the identified at least one potential leaked user credential corresponds to the at least one valid user credential of the computer network, removing the identified at least one potential leaked user credential from the at least one data source.

20. The non-transitory memory of claim 19, further comprising replacing credentials corresponding to the identified at least one potential leaked user credential.

* * * * *